Patented June 11, 1935

2,004,250

UNITED STATES PATENT OFFICE 2,004,250

AZO-DYESTUFFS, AND PROCESS OF MAKING SAME

Hans Schindhelm and Richard Gast, Frankfort-on-the-Main-Fechenheim, Germany, assignors to General Aniline Works, Inc., New York, N. Y., a corporation of Delaware No Drawing. Application February 21, 1933, Serial No. 657,923. In Germany February 29, 1932

10 Claims. (Cl. 260—69)

This invention relates to azo-dyestuffs and to a process of making same.

It is well known that azo-dyestuffs derived from diazotized 4-nitro-4'-amino-stilbene-2,2'-disulfonic acid have a very weak affinity for vegetable fiber (cf. Wahl, Bul. Soc. Chim. 3, vol. 29, 1903, page 349).

In accordance with the present invention these dyestuffs (or the corresponding dibenzyl compounds) corresponding to the formula

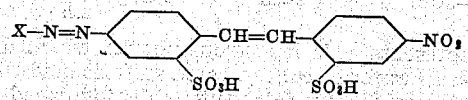

(wherein X means the radical of a coupling component in which a hydroxy group may be alkylated) are converted into valuable direct dyeing cotton dyestuffs by linking together two molecules thereof by a suitable conversion of their nitrogen-containing groups.

The new dyestuffs of the stilbene series correspond to the general formula

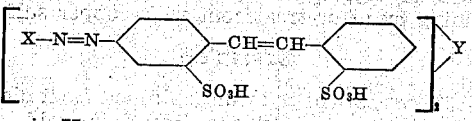

wherein X means the radical of a coupling component in which a hydroxy group may be alkylated and Y means a bivalent group containing two nitrogen atoms, This linking may be effected by partial reduction of the nitro-groups with the formation of azo- or azoxy-compounds or by transforming the nitro-azodyestuffs into the corresponding amino-azo-dyestuffs and linking these latter dyestuffs in the known manner by bivalent radicals, for example, by the CO-group or also by condensing the nitro-azo-dyestuffs with the corresponding amino-azo-dyestuffs.

The dyestuffs thus obtained may be subjected to an after-treatment in the manner known for stilbene- or azo-dyestuffs. As such methods of after-treatment oxidation, reduction, alkylation or formation of metallic complexes may be mentioned.

In many cases these dyestuffs may be also obtained by linking together two molecules of the 4-nitro-4'-amino-stilbene- (or dibenzyl-) 2,2'-disulfonic acid itself and by tetrazotizing the intermediate product thus obtained, for example, a dinitro-distilbene-urea-tetrasulfonic acid (if necessary after reduction) and combining it with suitable coupling components.

In contradistinction to the starting materials the present dyestuffs are distinguished by an excellent affinity for vegetable fiber and in many cases by a remarkable fastness of the dyeings obtained therewith.

In order to further illustrate our invention the following examples are given, the parts being by weight and all temperatures in centigrade degrees; but it is, however, to be understood that our invention is not limited to the particular products or reacting conditions mentioned therein:

Example 1

42.2 parts of the acid sodium salt of 4-nitro-4'-amino-stilbene-2,2'-disulfonic acid are diazotized and combined in the usual manner with 13.8 parts of salicylic acid. The dyestuff obtained is separated by the addition of hydrochloric acid and common salt and then filtered off. Then the dyestuff is dissolved in 1300 parts of water and 102 parts of caustic soda lye of 35° Bé. and at a temperature of 75° an aqueous solution of 19.5 parts of dextrose is added to the mass which is maintained for about 2 hours at this temperature. Finally the reaction mass is neutralized with hydrochloric acid, the reaction product is separated by means of common salt and then filtered off. The dried dyestuff which corresponds probably to the following formula

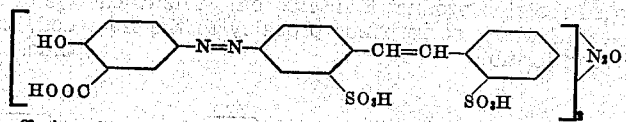
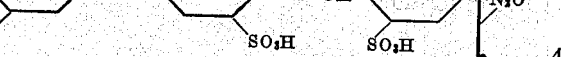

forms a brown powder soluble in water with an orange, in concentrated sulfuric acid with a violet color, dyeing cotton bright brownish orange shades which are distinguished by their fastness to light. By an after-treatment with copper sulfate the fastness-qualities of these dyeings, especially to light, are increased.

The same dyestuff is obtained by treating nitro-amino-stilbene-disulfonic acid with a caustic lye and dextrose, tetrazotizing the diamino-azoxy-distilbene-tetrasulfonic acid thus obtained and combining it with salicylic acid.

Example 2

61.5 parts of nitro-amino-stilbene-disulfonicacid-azo-salicylic acid are suspended in 450 parts of water and then an aqueous solution of 36 parts of crystallized sodium sufide is added at 35°. When the reduction is complete the amino-azo-dyestuff is separated by the addition of 18 parts of hydrochloric acid of 20° Bé. and common salt and after cooling it is filtered off. The dyestuff is redissolved in water and phosgene is introduced into the solution in the presence of alkali until the conversion in the urea-derivative is complete. Finally the reaction mass is made alkaline by adding sodium carbonate solution, the dyestuff is precipitated by the addition of common salt and filtered off.

The dried dyestuff forms an orange-brown powder soluble in water with an orange-yellow, in concentrated sulfuric acid with a wine-red color. It corresponds to the following formula

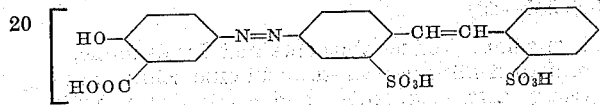

and dyes cotton bright yellow shades of excellent fastness to light. By after-treating with copper sulfate the fastness to light is increased and moreover an excellent fastness to washing is thus obtained.

By using, instead of salicylic acid, o- or m-cresotic acid, dyestuffs of similar properties are obtained.

By treating nitro-amino-stilbene-disulfonic acid with phosgene in the presence of alkali, reducing the dinitro-distilbene-urea-tetrasulfonic acid, tetrazotizing and combining it with salicylic acid, the same dyestuff is obtained.

*Example 3*

The mono-azo-dyestuff, obtained by diazotizing 42.2 parts of nitro-amino-stilbene-disulfonic acid and coupling with 31.5 parts of 2-phenyl-amino-5-naphthol-7-sulfonic acid in a solution of alkali-bicarbonates, is warmed to 40°, then precipitated by the addition of common salt and filtered off. The paste thus obtained is dissolved in 2000 parts of water and treated at 80° for about 2 hours with 90 parts of caustic soda lye of 35° Bé. and 17 parts of dextrose. The separated reaction product is filtered off. The dried dyestuff which corresponds probably to the following formula

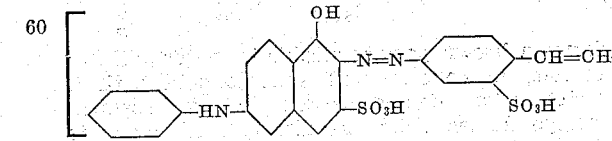

represents a dark powder having a metallic lustre. It dissolves in water and in concentrated sulfuric acid with a violet color and dyes cotton beautiful reddish violet shades of an excellent fastness to washing.

By using instead of the 2-phenylamino-5-naphthol-7-sulfonic acid the 2-(4'-hydroxy-3'-carboxy-phenyl-amino)-5-naphthol-7-sulfonic acid also a substantive violet dyestuff is obtained. By after-treating the dyeings of this dyestuff with copper-sulfate, violet shades of good fastness to washing are obtained.

*Example 4*

79.2 parts of the mono-azo-dyestuff, obtained and used according to the foregoing example, are reduced into the amino-azo-dyestuff by means of 36 parts of sodium sulfide. This dyestuff is treated with phosgene in a solution of alkali-bicarbonates until the formation of the urea is finished. Then the reaction mass is made weakly alkaline by adding at 90° a sodium carbonate solution and filtered off. The dried dyestuff corresponds to the following formula

It represents a dark lustrous powder which dissolves in water or concentrated sulfuric acid with a violet color. The dyestuff is distinguished by an excellent affinity for cotton and dyes thereupon bright reddish violet shades, fast to washing.

By using instead of 2-phenyl-amino-5-naphthol-7-sulfonic acid the 2-(4'-hydroxy-3'-carboxy-phenyl-amino)-5-naphthol-7-sulfonic acid a dyestuff is obtained dyeing beautiful violet shades of a good affinity, which becomes fast to washing by after-treatment with copper sulfate.

*Example 5*

53.9 parts of the dyestuff, obtained from diazotized nitro-amino-stilbene-disulfonic acid and phenol, are methylated in the phenolic hydroxyl-group by a suitable alkylating agent, as, for example, alkali and dimethyl-sulfate or methyl chloride. In order to transform this methylated product into a new substantive azo-dyestuff, 56.3 parts of the product are dissolved in about 1800 parts of water and at 75° 103 parts of caustic soda lye of 35° Bé. and 21.5 parts of dextrose are added; the mass is maintained at 75–80° for some time. After cooling down the precipitated dyestuff is filtered off by suction. The dried dyestuff which corresponds probably to the following formula

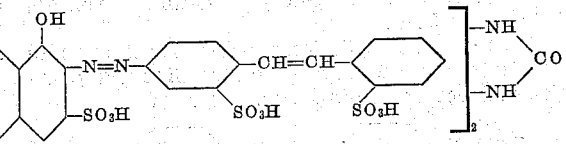

represents an orange-red powder; it dissolves in water with an orange, in concentrated sulfuric acid with a bluish violet color and dyes cotton bright orange shades, fast to light and to chlorine.

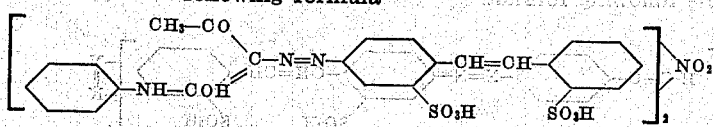

The same product is obtained by dissolving the same quantity of the methylated mono-azo-dyestuff in 1500 parts of water and boiling under reflux for about 30 hours with 200 parts of caustic soda lye of 35° Bé. without the addition of dextrose.

By treating the ethylation-product of the same starting material with dextrose and a caustic soda lye, a dyestuff is produced which shows nearly the same shade and fastness.

*Example 6*

56.3 parts of the methylated dyestuff, obtained from nitro-amino-stilbene-disulfonic-acid-azo-

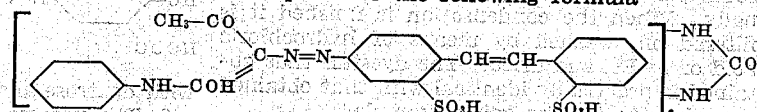

phenol (according to the foregoing example) are reduced at 35° in an aqueous solution of 36 parts of crystallized sodium sulfide, precipitated by the addition of hydrochloric acid and common salt and filtered off. Into the alkaline solution of the amino-azo-dyestuff phosgene is introduced until unchanged dyestuff is no longer to be proved. Then the reaction mass is made alkaline by the addition of sodium carbonate, the dyestuff is precipitated by adding common salt and filtered off. The dried dyestuff corresponds to the following formula

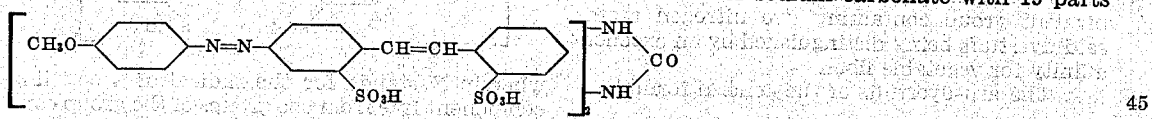

and represents an orange-red powder which dissolves in water with an orange-yellow, in concentrated sulfuric acid with a bluish red color, dyeing cotton bright greenish yellow shades; the dyeings are distinguished by excellent fastness to light and to washing.

The corresponding ethylated dyestuff has nearly the same properties.

*Example 7*

The diazo-compound of 42.2 parts of nitro-amino-stilbene-disulfonic acid is combined in the usual manner with 17.7 parts of acetoacetic acid anilide and the formed dyestuff is filtered off. The product thus obtained is suspended at 75° in 1200 parts of water, 100 parts of caustic soda lye of 35° Bé. and 18 parts of dextrose are added and the mass is stirred for about 3 hours at the same temperature. The dyestuff, which is isolated by filtration, corresponds probably to the following formula

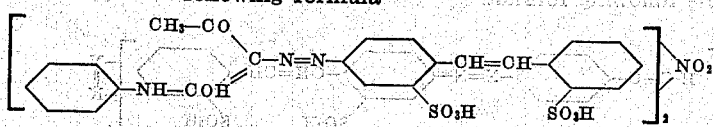

It represents when dry a reddish brown powder which dissolves in water with an orange, in concentrated sulfuric acid with a reddish violet-brown color, dyeing cotton bright orange shades fast to washing.

*Example 8*

The mono-azo-dyestuff, obtained according to the foregoing example from 42.2 parts of nitro-amino-stilbene-disulfonic acid and 17.7 parts of acetoacetic acid anilide, is reduced into the amino-azo-dyestuff by means of 36 parts of crystallized sodium sulfide and separated. By introducing phosgene into the alkaline solution of this dyestuff the urea is obtained which is isolated in the usual manner. The dried reaction product corresponds to the following formula

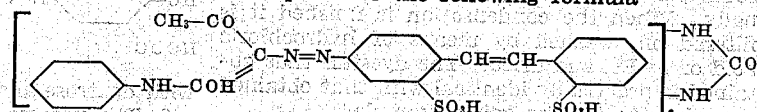

and dissolves in water with an orange-yellow, in concentrated sulfuric acid with a yellowish brown color. It dyes cotton beautiful yellow shades which are fast to washing.

*Example 9*

18.4 parts of cyanuric chloride are condensed in an aqueous solution in the presence of sodium bicarbonate with 84.4 parts of nitro-amino-stilbene-disulfonic acid. The obtained condensation product is reduced, tetrazotized and combined in a solution of sodium carbonate with 19 parts

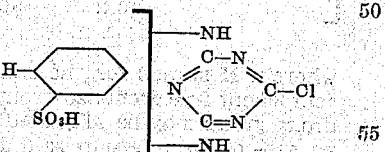

of phenol. The disazodyestuff thus obtained is methylated. It corresponds to the following formula

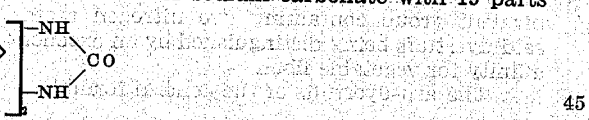

and dissolves in water with a yellow color which turns no more over to red after the addition of alkali. Its solution in concentrated sulfuric acid is yellowish red. The dyeings on cotton are yellow and fast to light.

The same dyestuff can be obtained by combining the reduced dyestuff from diazotized nitro-amino-stilbene-disulfonic acid with phenol, methylating, reducing and condensing with cyanuric chloride.

*Example 10*

78 parts of diamino-azo-distilbene-tetra-sulfonic acid (obtained by reduction of nitroamino-stilbene-disulfonic acid with zinc dust and oxydation of the formed hydrazo-compound) are tetrazotized and combined with 19 parts of phenol in a solution of sodium carbonate. The dyestuff which is not sufficiently fast to alkali is methylated as described in Example 5. The trisazo-dyestuff thus obtained corresponds to the following formula

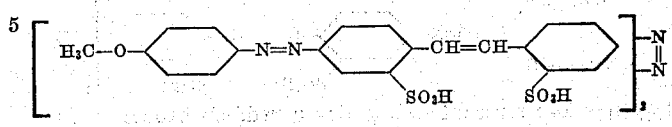

and dissolves in concentrated sulfuric acid with a blue color. It dyes cotton orange shades which are fast to light.

*Example 11*

14.5 parts of the reduced dyestuff (obtained by combining the diazo-compound of nitro-amino-stilbene-disulfonic acid with phenol and subsequently methylating) are heated under reflux for about 20 hours with 16.5 parts of the unreduced dyestuff in 600 parts of normal caustic soda lye. The new dyestuff precipitates gradually. When the condensation is finished it is filtered off, washed by means of hydrochloric acid of 3° Bé. and dried. The dyestuff thus obtained is practically identical with that obtained according to the foregoing example.

We claim:—

1. The azo-dyestuffs of the general formula

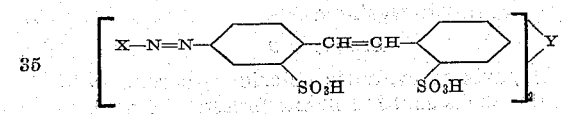

wherein X stands for the radical of a coupling component free from azo groups in which an hydroxy group may be alkylated and Y stands for a bivalent group containing two nitrogen atoms, said dyestuffs being distinguished by an excellent affinity for vegetable fiber.

2. The azo-dyestuffs of the general formula

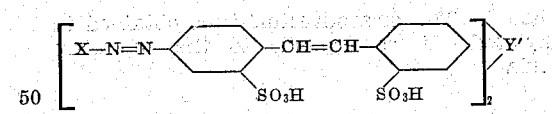

wherein X stands for the radical of a coupling component free from azo groups in which an hydroxy group may be alkylated and Y' stands for an azo- or azoxy-group, said dyestuffs being distinguished by an excellent affinity for vegetable fiber.

3. The azo-dyestuff of the formula

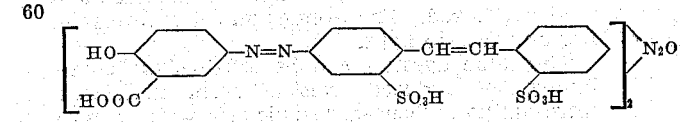

said dyestuff being distinguished by an excellent affinity for vegetable fiber, dyeing cotton bright brownish orange shades fast to light.

4. The azo-dyestuff of the formula

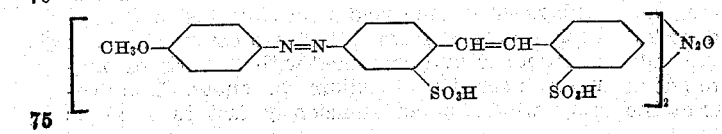

said dyestuff being distinguished by an excellent affinity for vegetable fiber, dyeing cotton bright orange shades fast to light and chlorine.

5. The process which comprises subjecting an azo-dyestuff of the general formula

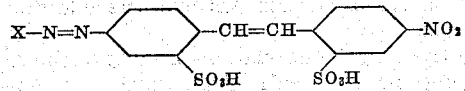

(wherein X means the radical of a coupling component which may be alkylated) to the action of a feebly acting reducing agent.

6. The process which comprises reducing the azo-dyestuff of the formula

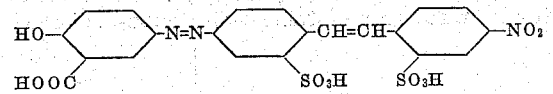

with dextrose and alkali.

7. The process which comprises reducing the azo-dyestuff of the formula

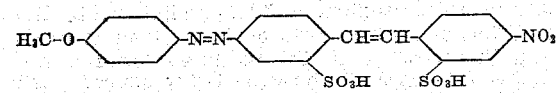

with dextrose and alkali.

8. The azo dyestuffs of the general formula:

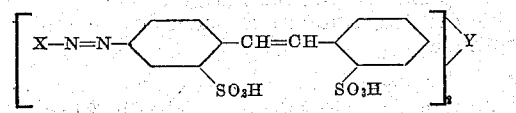

wherein X stands for the radical of a coupling component free from azo groups of the group consisting of hydroxylated benzene compounds the hydroxyl group of which may be alkylated, hydroxylated naphthalene compounds and acetoacetic acid arylides and Y stands for a bivalent group containing two nitrogen atoms, said dyestuffs being distinguished by an excellent affinity for vegetable fiber.

9. The azo dyestuffs of the general formula:

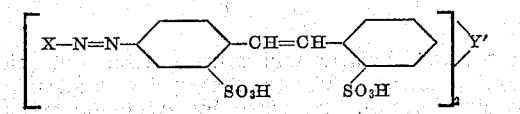

wherein X stands for the radical of a coupling component free from azo groups of the group consisting of hydroxylated benzene compounds the hydroxyl group of which may be alkylated, hydroxylated naphthalene compounds and acetoacetic acid arylides and Y' stands for an azo- or azoxy-group, said dyestuffs being distinguished by an excellent affinity for vegetable fiber.

10. The azo dyestuff of the formula:

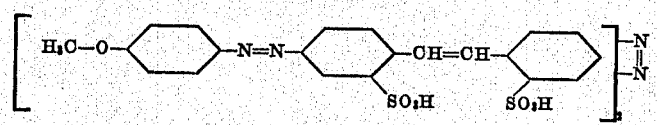

said dyestuff being distinguished by an excellent affinity for vegetable fiber, dyeing cotton bright orange shades fast to light and chlorine.

HANS SCHINDHELM.
RICHARD GAST.